Reissued June 26, 1928. Re. 17,010

UNITED STATES PATENT OFFICE.

FREDERIC E. BOELKOW AND FRIEDRICH WILHELM OTTO LISTING, OF MILWAUKEE, WISCONSIN, ASSIGNORS TO DURABLE FLOOR CORPORATION, OF MILWAUKEE, WISCONSIN, A CORPORATION OF WISCONSIN.

ELASTIC COMPOSITION FLOOR.

No Drawing. Original No. 1,635,982, dated July 19, 1927, Serial No. 82,579, filed January 20, 1926. Application for reissue filed September 28, 1927. Serial No. 222,683.

Our invention relates to an improvement in composition floors, which possess the very desirable attributes of durability and permanence, and at the same time have the likewise desirable feature of elasticity, which latter contributes greatly to the comfort of persons whose work requires them to stand upon a floor for protracted periods of time.

The composition floor embodied in our invention is intended primarily for use in dwelling houses. It is impervious to moisture and has been used advantageously in bath-rooms and kitchens, where frequent scrubbing is necessary, as well as in the other rooms of the dwelling. But its use is not limited to houses used for residential purposes alone, for its very durable qualities have given it favor in offices, business houses and factories, where traffic is voluminous. It is entirely free from the objections attendant upon the use of floors of the strenolith type, in that it is not susceptible to wear and consequently does not produce dust. Moreover, in addition to being elastic to the tread, that same property preserves the composition floor from cracking and so becoming unsightly.

The invention relates to a composition having certain ingredients suitable for the purposes of my invention, into which composition coloring matter is introduced and distributed preferably by a peculiarly novel method, as hereinafter set forth.

The improved composition floor may be readily laid in old buildings as well as new. In practicing the invention, we first prepare and lay a base, this being composed of commercial wood flour or a mixture of wood flour with fine sawdust (25%), magnesite (25%), and gray silica (50%), which is mixed with a suitable quantity of magnesium chloride to produce a thoroughly coherent plastic mass, the plastic mass being spread over the floor boards and pressed or rolled into a layer approximately ⅜ths of an inch in thickness. This base will be nailed to the flooring boards.

The surface layer is composed of the best grade of wood flour (25%), magnesite (45%), white silica (18%), and flake asbestos (12%). This composition is likewise mixed with a suitable quantity of magnesium chloride so as to form a thoroughly saturated and coherent plastic mass of the nature of that first described, but which may be less moist, and is spread over the base in a layer approximately ⅜ths of an inch in thickness.

The best results are obtained by tamping the surface layer with wooden tamping devices of flat face and about 12 inches square, such tamping devices being provided on their flat face with parallel ribs about one-half an inch wide and spaced the same distance apart, so as to thoroughly impact the plastic material into a closely adhering mass and express the surplus moisture therefrom. While we prefer the tamping described, other pressure methods may be used.

Practice of the invention as above described, will produce a floor the surface of which is neutral in tint, but which is acceptable in certain places and is economical.

Variegated surface appearance in the floors of dwelling houses is often required, and to produce the desired effects, we introduce coloring matters into the composition forming the surface layer of the floor. This is effected by dividing the mixed bulk which is to form the surface layer into a number of parts, either while its components are in a dry state or after they have been converted into a plastic state, and mixing with the selected divisional parts suitable coloring pigments, such as iron oxide, zinc oxide, carbon, canary yellow, Prussian blue, or other elements which will produce desired colors. Each sub-divided part is thoroughly mixed so that the chosen color permeates the whole of the particular part, and produces a uniformly colored divisional mass. In breaking up the differently colored divisional parts, now in a plastic state, previous to the mixing of all of the parts so as to effect distribution of the colors throughout the whole mass, we rub such differently colored parts through a screen of suitable mesh, or pass them through a grinder, from which they emerge as separated particles.

The several differently colored parts, each now in the form of a cohering but readily frangible mass, are mixed together so as to effect a good distribution of the separate colors throughout the whole, the colored fragments, however, remaining distinct with their separate entities preserved. The plastic aggregate with the colors distributed therethrough, is now laid as a surface coat and treated in the manner hereinbefore described for laying the surface coat of a single color.

It is essential that care be exercised in the timing of the several operations, in order that the best results may be attained. The surface layer must be placed upon the base while the latter is damp, in order to bind properly and secure an integral formation. The tamping action must be performed at the time that the surface layer has received a suitable set. After the tamping action has been completed, the surface layer will be covered with a cloudy film, which is removed by scraping just before the final set of the surface layer takes place. After scraping, the several colors will stand out distinctly and in such manner as to give the surface of the floor a finished appearance which is highly pleasing. The finished surface may be rubbed with a thin coat of raw linseed oil. Aprons or wash-boards may be formed as parts of the composition floors, and from the material constituting the latter, without separation at their joining lines. This feature of construction is particularly serviceable in bath-rooms and kitchens. The proportions hereinbefore stated are approximate. Borders of solid color are preferable, and contribute greatly to the appearance of the improved composition floor.

Having thus described our invention, what we claim and desire to secure by Letters Patent of the United States, is:

1. An improved composition for floors formed as a mixture substantially in the proportions stated of wood flour, magnesite, white silica, and flake asbestos, saturated with magnesium chloride, and adapted while plastic to be pressed into place.

2. An improved composition for floors, the constituents of which are as follows and substantially in the proportions stated, namely, wood flour 25%, magnesite 45%, white silica 18%, and flake asbestos 12%, saturated with magnesium chloride to bind the constituent elements together.

3. An improved composition floor, comprising a base layer formed as a plastic, in combination with a surface layer, the latter being composed of wood flour, magnesite, white silica, and flake asbestos substantially in the proportions stated, saturated with magnesium chloride.

4. An improved composition floor comprising a homogeneous plastic layer pressed into place, and formed of wood flour, magnesite, white silica, flake asbestos and coloring matter, saturated with magnesium chloride, and presenting a variegated colored surface in which the separate entities of the fragments colored by the coloring matter are preserved.

5. A magnesite floor containing wood flour and asbestos as an aggregate or filler, substantially in the proportions stated.

6. The method of making elastic composition floors, which comprises the formation of separate colored plastic mixtures of wood flour, magnesite, silica and asbestos, with magnesium chloride as a saturant, passing the several colored mixtures through a screen to break them into fragments, mixing the fragments to distribute the colors with their separate entities preserved, spreading the vari-colored mass into a layer, and tamping the layer to impact it into place and express surplus moisture therefrom.

7. The method of making elastic composition floors, which comprises the formation of a plurality of separate colored plastic mixtures, passing the several colored mixtures through a screen to break them into fragments, mixing the fragments to distribute the colors with their separate entities preserved throughout the mass, spreading the vari-colored mass into a layer, and tamping the layer to impact it into place and express surplus moisture therefrom.

8. The method of making elastic composition floors, which comprises the steps of mixing wood flour, magnesite, silica, and asbestos and saturating the mixture with magnesium chloride to produce a cohering mass, dividing the mass and mixing coloring matter with the divided portions, breaking the latter into fragments and then mixing the fragments to distribute the colors with their separate entities preserved in the mass, spreading the vari-colored mass to form a layer, and tamping the layer to impact it and express the surplus moisture therefrom.

9. The method of making elastic composition floors, which comprises the steps of mixing wood flour, magnesite, silica, and asbestos and saturating the mixture with magnesium chloride to produce a cohering mass, dividing the mass and mixing coloring matter with the divided portions, breaking the latter into fragments by passing through a screen and then mixing the fragments to distribute the colors with their separate entities preserved in the mass, spreading the vari-colored mass to form a layer, and tamping the layer to impact it and express the surplus moisture therefrom.

In testimony whereof, we have signed our names at Milwaukee.

FREDERIC E. BOELKOW.
FRIEDR. WILH. OTTO LISTING.